United States Patent [19]
Gittins et al.

[11] Patent Number: 5,795,997
[45] Date of Patent: Aug. 18, 1998

[54] VEHICLE STEERING OFFSET MONITOR

[76] Inventors: Arthur J. Gittins, 853 2nd Ave., Salt Lake City, Utah 84103; Richard H. Adamson, 44 W. 700 N, Bountiful, Utah 84010; Lawrence J. Wanner, 670 E Browning Ave., Salt Lake City, Utah 84105

[21] Appl. No.: 633,579

[22] Filed: Aug. 1, 1996

[51] Int. Cl.⁶ ............................................. G01M 19/00
[52] U.S. Cl. ................................... 73/118.1; 340/438
[58] Field of Search ........................... 73/118.1; 340/438

[56] References Cited

U.S. PATENT DOCUMENTS

| | | | |
|---|---|---|---|
| 3,889,527 | 6/1975 | Wallace | 73/118.1 |
| 4,838,074 | 6/1989 | Morishita et al. | 73/118.1 |
| 4,856,323 | 8/1989 | Morishita et al. | 73/118.1 |
| 4,875,367 | 10/1989 | Morishita et al. | 73/118.1 |
| 4,924,696 | 5/1990 | Schroeder et al. | 73/118.1 |
| 4,955,228 | 9/1990 | Hirose et al. | 73/118.1 |
| 4,967,858 | 11/1990 | Kotake et al. | 73/118.1 |
| 5,008,823 | 4/1991 | Takahashi | 73/118.1 |
| 5,020,616 | 6/1991 | Yagi et al. | 73/118.1 |
| 5,027,648 | 7/1991 | Filleau | 73/118.1 |
| 5,029,466 | 7/1991 | Nishihara et al. | 73/118.1 |
| 5,088,319 | 2/1992 | Hirose et al. | 73/118.1 |
| 5,123,279 | 6/1992 | Henein et al. | 73/118.1 |
| 5,287,755 | 2/1994 | Stecher | 73/118.1 |
| 5,309,758 | 5/1994 | Kubota et al. | 73/118.1 |
| 5,544,522 | 8/1996 | Little | 73/118.1 |

Primary Examiner—George M. Dombroske
Attorney, Agent, or Firm—James L. Sonntag

[57] ABSTRACT

A apparatus and method for detecting an out-of-alignment condition of a wheeled vehicle with at least one steered wheel controlled by a steering wheel by comparing the relative number of periodic samples during a sampling period in which the vehicle steering wheel is positioned right of the center position as compared to left of the center position.

20 Claims, 26 Drawing Sheets

Top Viewed From Top

Bottom Viewed From Top

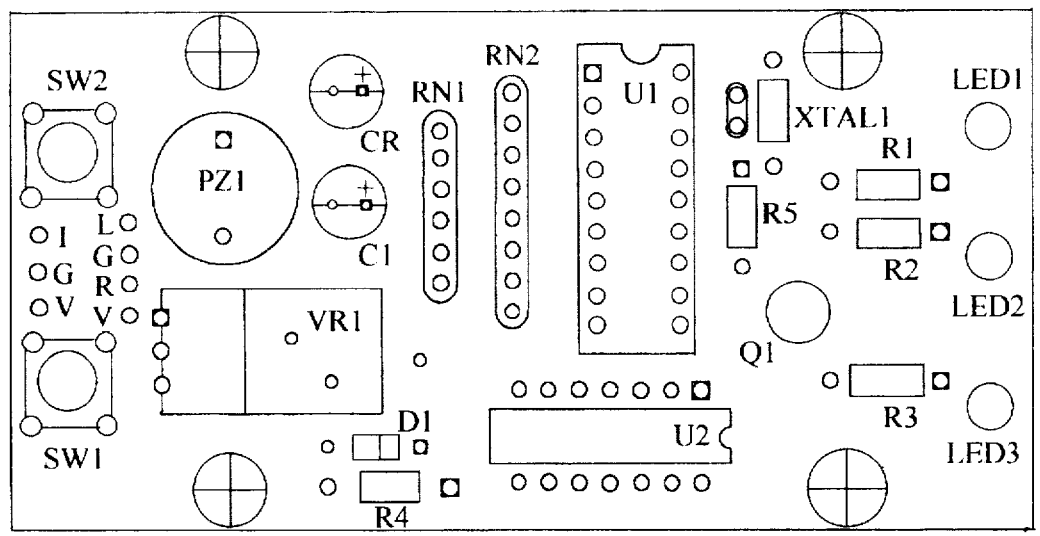
FIG. 10
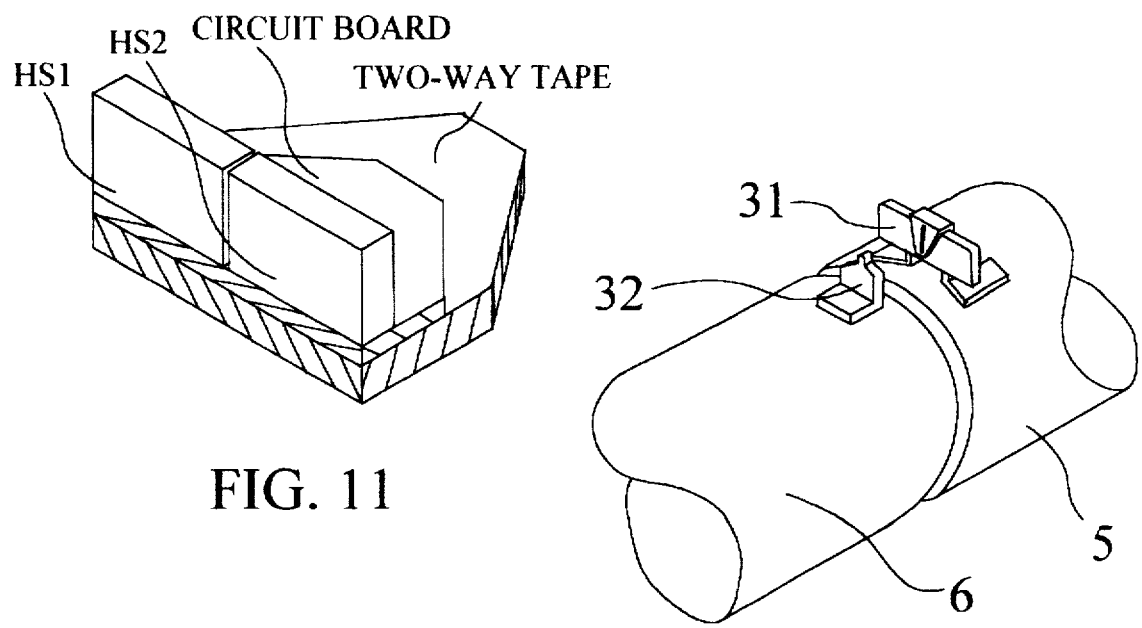
FIG. 11
FIG. 12

MAGNET 3 AND SENSOR 4 (TRANSISTORS 1 AND 2)

TRUTH TABLE

LOGIC DIAGRAM

| Magnet 3 Position | Transistor 1 Output Logic | Transistor 2 Output Logic |
|---|---|---|
| Center | 0 | 0 |
| Left Center | 0 | 1 |
| Left | 1 | 1 |
| Right Center | 1 | 0 |
| Right | 1 | 1 |

NAND LATCH 7 TRUTH TABLE

| Nand Latch 7a Input Logic | Nand Latch 7b Input Logic | Nand Latch 7c Output Logic | Nand Latch 7d Output Logic |
|---|---|---|---|
| 0 | 0 | 1 | 1 |
| 0 | 1 | 1 | 0 |
| 1 | 1 | Holds Last Logic Levels (Latches) | |
| 1 | 0 | 0 | 1 |
| 1 | 1 | Holds Last Logic Levels (Latches) | |

MULT REGISTER, NUMB 640 REGISTER AND TOTAL COUNT RELATIONSHIP

| Mult Register Dec | Numb 640 Register Dec | Numb 640 Count Down Dec | Total Count Dec |
|---|---|---|---|
| Initialize to 3 | Init 213 | 213 to 0 | 0 to 213 |
| Decrement to 2 | New 213 | 213 to 0 | 214 to 426 |
| Decrement to 1 | New 213 | 213 to 0 | 427 to 639 |

FIG. 18

FAILURE REQUIREMENT DATA TABLE

| Failure Number | Left Failure | Right Failure | L_Fault Register | R_Fault Register | Fault Register | Accumulated L, R Reg Diff |
|---|---|---|---|---|---|---|
| 1 | Yes | No | 3-1 = 2 | 3+1 = 4 | 3 | 1L, 0R (1L) |
| 2 | Yes | No | 2-1 = 1 | 4+1 = 5 | 3 | 2L, 0R (2L) |
| 3 | No | Yes | 1+1 = 2 | 5-1 = 4 | 3 | 1L, 0R (1L) |
| 4 | No | Yes | 2+1 = 3 | 4-1 = 3 | 3 | 0L, 0R (0) |
| 5 | No | Yes | 3+1 = 4 | 3-1 = 2 | 3 | 0L, 1R (1R) |
| 6 | Yes | No | 4-1 = 3 | 2+1 = 3 | 3 | 0L, 0R (0) |
| 7 | Yes | No | 3-1 = 2 | 3+1 = 4 | 3 | 1L, 0R (1L) |
| 8 | Yes | No | 2-1 = 1 | 4+1 = 5 | 3 | 2L, 0R (2L) |
| 9 | No | No | Skipped | Skipped | 3 | Recycled |
| 10 | Yes | No | 1-1 = 0 | 5+1 = 6 | 3 | 3L, 0R (3L) |

FIG. 19

MULT REGISTER, MSB, LSB AND TOTAL COUNT RELATIONSHIP

| Mult Register Dec | MSB Led Bin | LSB Led Bin | Total Count Dec |
|---|---|---|---|
| Initialize to 3 | On | On | 0 To 213 |
| Decrement to 2 | On | Off | 214 To 426 |
| Decrement to 1 | Off | On | 427 To 639 |

FIG. 20

PIC55 TEST MODEL PROGRAM FLOW DIAGRAM

```
<Start>
initialize variables
turn off LEDs
set TF LEDs to 00
goto <Main>
```

```
<Main>
if IGN does not = 1 goto <Ignition>
        (IGN = 1 - IGN is on)
if ST does not = 0 delay for 62 ms
delay for 4ms
if In _Right = 0 goto <DecL_Samples>
        (low assertion)
if In _Left = 0 goto <DecR_Samples>
        (low assertion)
(In_Right, In_Left = 0 = centered)
set Center Green LED on
turn off other 2 LEDs
dec Center
 if Center = 0 goto <Section5>
 goto <MAIN>
```

FIG. 21A

<Section5>
(test the Numb640 reg count)
dec Numb640
 if Numb640 does not = 0 goto <Test128>
        (Numb640 = 0)
set Numb640 to 213d
dec Mult reg
 if Mult = 0 goto <Completed>
        (Mult does not = 0)

<Test128>
(test Samples128 reg for 01 of FF)
set MSB of the Store reg to 0
dec Samples128 (01 to 00)
        (put results into W)
if W = 0 goto <Setup>
        (Samples128 does not = 01)
set MSB to the Store reg to 1
inc Samples128 (FF to 00)
        (put results into W)
if W = 0 goto <SetUp>
        (Samples128 does not = FF)
goto <Main>
        (go back for another set of samples)

FIG. 21B

\<SetUp\>
(Samples128 overflowed - fault)
turn off LEDs
set Delays = 2
if ST = 0 set Delays = 1
assert TF piezo
set Mult LEDs with Mult reg value
    (dump Numb640 value to TF)
set Temp = Numb640
reset Data_Out bit \<Dump1\>
if MSB of Temp = 1 set Data_Out bit
set Clk_Out bit
reset Clk_Out bit
reset Data_Out bit
rotate left Temp reg
dec Eight reg
if Eight does not = 0 goto \<Dump1\>
    (Eight = 0 - latch data into reg)
set Latch bit
reset Lach bit
    (reset all register)
set Eight to _Eight
set Samples128 to 128d
set Mult640 to _Mult640
reset all other registers
if MSB of Store = 0 goto \<Left\>
goto \<Right\>

FIG. 21C

```
<DecL_Samples>
set Left Green LED on
turn off other 2 LEDs
dec L_Samples
if L_Samples does not = 0 goto <Main>
         (L_Samples = 0)
dec Samples_128
goto <Section5>
```

```
<DecR_Samples>
set Right Green LED on
turn off other 2 LEDs
dec R_Samples
if R_Samples does not = 0 goto <Main>
         (R_Samples = 0)
inc Samples_128
goto <Section5>
```

```
<Right>
set LED '128 Right' on TF
inc L_Faults
dec R_Faults
if R_Faults do not = 0 goto <Main>
         (3 consectuive faults occured)
set Right LED Red (Main)
reset Left LED
goto <Failure>
```

FIG. 21D

\<Left\>
set 'LED128 Left' on TF
inc R_Faults
dec L_Faults
if L_Faults do not = 0 goto \<Main\>
    (3 consectuive faults occured)
set Left LED Red (Main)
reset Right LED
goto \<Failure\>

\<Ignition\>
if Self Test = 0 goto \<Main\>
if IGN = 0 goto \<IgnOff\>
    (ST and RESET are low asserting)
store hall port values
delay for 1 sec (Delays = 1)
compare stored value with current port value
if port did not change go back to \<Ignition\>
    (port changed)
dec Misses
if Misses does not = 0 go back to \<Ignition\>
    (Misses = 0)
set Misses to _Misses
goto \<Main\>

\<Delay 1S\> (call function)
    (delays for 1 or 2 seconds)
set Timer 1 & 2 for correct loop count
loop for 1 S
test Delays
loop to return

FIG. 21E

<IgnOff>
(IGN = 0)
set Misses to _Misses
delay for 2 sec for keybounce (Delays = 2)
if IGN does not still = 0 go back to <Ignition>
(glitch)
(IGN = 0)
turn off main LEDs <Ign2>
delay for 2 sec for keybounce (Delays = 2)
if IGN is still 0 loop back to <Ign2> (waiting)
(IGN = 1)
delay for 2 sec for keybounce (Delays = 2)
if IGN is 0 again (glitch) loop back to <IgnOff>
<IGN = 1)
goto <Ignition>

---

<Delay62> (call function)
set Timer 1 & 2 for correct loop count
loop for 62mSec
return

---

<Delay4ms> (call function)
set Timer 1 & 2 for correct loop
count for 4ms.
return

---

<AllOff> (call function)
turn off 3 LEDs
return

FIG. 21F

| |
|---|
| \<Failure\><br>Store LEDs port values (bits 0,1,2 of Store) |
| \<Fail\><br>assert piezo for 1 sec (Delays =1)<br>recall and set LED values from Store |
| \<IGN3\><br>delay for 2 S for keybounce (Delays = 2)<br>if IGN is still 1 goto \<IGN3\><br>      (IGN = 0)<br>turn off LEDs |
| \<IGN4\><br>delay for 2S for keybounce (Delays = 2)<br>if IGN is still 0 goto \<IGN4\><br>      (IGN =1)<br>delay for 2S for keybounce (Delays = 2)<br>if IGN = 0 goto \<IGN4\> (glitch)<br>      (IGN = 1 -- just starting the car in<br>             failed mode)<br>set Misses to _Misses |
| \<Ignition2\><br>if IGN = 0 goto \<IGN4\><br>store hall port values<br>delay for 1 sec (Delays = 1)<br>compare stored value with current port value<br>if port did not change go back to \<Ignition2\><br>      (port changed)<br>dec Misses<br>if Misses does not = 0 go back to \<Ignition2\><br>      (Misses = 0)<br>goto \<Fail\> (waiting for Reset) |

FIG. 21G

\<Completed\>
turn off all LEDs
set Delays = 2
if ST = 0 set Delays = 1
assert TF piezo
turn on main Center Green LED
turn off other 2 LEDs
turn on 640 LEDs (TF)
set Temp to Samples128 value
    (dump Temp to TF)
reset Data_Out bit
\<Dump2\>
if MSB of Temp = 1 set Data_Out bit
set Clk_Out bit
reset Clk_Out bit
reset Data_Out bit
rotate left Temp reg
dec Eight reg
if Eight does not = 0 goto \<Dump2\>
    (Eight = 0 - latch data ainto reg)
set Latch bit
reset Latch bit
    (reset all registers)
set Eight to _Eight
set Mult reg to _Mult
set Samples128 to 128d
set Mult640 to _Mult640
reset all other registers
goto \<Main\>

FIG. 21H

PIC54 PRODUCTION MODEL
PROGRAM FLOW DIAGRAM

<Start> initializes all ports and registers.

```
<Start>
initialize variables
turn off LEDs
goto <Main>
```

<Main> checks the condition of Ign switch, the self test switch and the steering wheel sensors and sends the program to the correct routine.

```
<Main>
if IGN does not = 1 goto <Ignition>
        (IGN = 1 - IGN is on)
if ST does not = 0 delay for 66 ms if In _Right = 0 goto <DecL_Samples>
        (low assertion)
if In _Left = 0 goto <DecR_Samples>
        (low assertion)
(In_Right, In_Left = 11 = centered)
set Center Green LED on
turn off other 2 LEDs
goto <MAIN> (loops without
                    counting)
```

FIG. 22A

<Section5> and <Test128> calculates the number of counts the steering wheel is in the left and right quads. If the wheel stays in one quad too long an error occurres and <SetUp> is called, else the average time between quads is good and <Complete> is called.

<Section5>
(test the Numb640 reg count)
dec Numb640
   if Numb640 does not = 0 goto <Test128>
          (Numb640 = 0)
set Numb640 to 213d
dec Mult reg
   if Mult = 0 goto <Completed>
          (Mult does not = 0)

<Test128>
(test Samples128 reg for 01 of FF)
set MSB of the Store reg to 0
dec Samples128 (01 to 00)
        (put results into W)
if W = 0 goto <Setup>
        (Samples128 does not = 01)
set MSB to the Store reg to 1
inc Samples128 (FF to 00)
        (put results into W)
if W = 0 goto <SetUp>
        (Samples128 does not = FF)
goto <Main>
   (go back for another set of samples)

FIG. 22B

<SetUp> resets the registers and the ports, then calls the appropriate fault routine.

```
<SetUp>
        (Samples128 overflowed - fault)
turn off LEDs
set Delays = 2
if ST = 0 set Delays = 1
set Samples128 to 128d
set Mult640 to _Mult640
reset all other registers
if MSB of Store = 0 goto <Left>
goto <Right>
```

<Left> and <Right> are fault routines. They turn the correct LED red and alert the driver that there is a problem.

```
<Left>
if R_Faults < 3 inc R_Faults
dec L_Faults
if L_Faults do not = 0 goto <Main>
            (3 consectuive faults occured)
set Left LED Red
reset Right LED
goto <Failure>
```

```
<Right>
if L_Faults < 3 inc L_Faults
dec R_Faults
if R_Faults do not = 0 goto <Main>
            (3 consectuive faults occured)
set Right LED Red
reset Left LED
goto <Failure>
```

FIG. 22C

<DecL_Samples> and <DecR_Samples> sets the LED display. It also counts the number of counts the steering wheel was in each quadrant. When the steering wheel stays in one quadrant too long, the program branches to another routine.

```
<DecL_Samples>
set Left Green LED on
turn off other 2 LEDs
dec L_Samples
if L_Samples not = 0 goto <Main>
    (L_Samples = 0)
dec Samples_128
goto <Section5>
```

```
<DecR_Samples>
set Right Green LED on
turn off other 2 LEDs
dec R_Samples
if R_Samples not = 0 goto <Main>
    (R_Samples = 0)
inc Samples_128
goto <Section5>
```

<Delay66> and <Delay1S> are delay functions used throughout the program.

```
<Delay1S> (call function)
    (delays for 1 or 2 seconds)
set Timer 1 & 2 for correct loop count
loop for 1 S
test Delays
loop to return
```

FIG. 22D

```
            <Delay66> (call function)
            set Timer 1 & 2 for correct loop count
            loop for 66mSec
            return
```

<Ignition>
waits for
car's steering
wheel to
change a
number of
times to
allow the car
to back out
of the
driveway
and start
down the
road before
sampling.

```
<Ignition>
if Self Test = 0 goto <Main>
if IGN = 0 goto <IgnOff>
       (ST and RESET are low asserting)
store hall port values
delay for 1 sec (Delays = 1)
compare stored value with current port value
if port did not change go back to <Ignition>
       (port changed)
dec Misses
if Misses does not = 0 go back to <Ignition>
       (Misses = 0)
set Misses to _Misses
goto <Main>
```

<AllOff> turns
off the LEDs.

```
<AllOff> (call function)
turn off 3 LEDs
return
```

FIG. 22E

<IgnOff>
(IGN = 0)
set Misses to _Misses
delay for 2 sec for keybounce (Delays = 2)
if IGN does not still = 0 go back to <Ignition>
    (IGN = 0)
turn off LEDs <Ign2>
delay for 2 sec for keybounce (Delays = 2)
if IGN id still 0 loop back to <Ign2> (Waiting)
    (IGN = 1)
delay for 2 sec for keybounce (Delays = 2)
if IGN is 0 again (glitch) loop back to <IgnOff>
    <IGN = 1)
goto <Ignition>

<IgnOff> tests the car's ignition. If the ignition is off, the program turns off the LEDs and waits for the Ign to turn back on.

FIG. 22F

<Failure> memorizes which LEDs are on and waits for the Reset button to be pressed. If the Ignition is turned off, the car waits for the Ign to be turned on. <Ignition2> turns the LEDs back on and alerts the driver with the piezo.

| |
|---|
| <Failure><br>Store LEDs port values (bits 0,1,2 of Store) |
| <Fail><br>assert piezo for 1 sec (Delays =1)<br>recall and set LED values from Store |
| <IGN3><br>delay for 2 S for keybounce (Delays = 2)<br>if IGN is still 1 goto <IGN3><br>        (IGN = 0)<br>turn off LEDs |
| <IGN4><br>delay for 2S for keybounce (Delays = 2)<br>if IGN is still 0 goto <IGN4><br>        (IGN =1)<br>delay for 2S for keybounce (Delays = 2)<br>if IGN = 0 goto <IGN4> (glitch)<br>        (IGN = 1 -- just starting the car in<br>                     failed mode)<br>set Misses to _Misses |
| <Ignition2><br>store hall port values<br>delay for 1 sec (Delays = 1)<br>compare stored value with current port value<br>if port did not change go back to <Ignition2><br>        (port changed)<br>dec Misses<br>if Misses does not = 0 go back to <Ignition2><br>        (Misses = 0)<br>goto <Fail> (waiting for Reset) |

FIG.22G

<Complete> resets all the registers and ports and starts the counting over again. As long as the steering wheel stays in both quadrants the same amount of time, the program loops with no faults to alert the user.

```
<Completed>
turn off LEDs
set Delays = 2
if ST = 0 set Delays = 1
turn on Center Green LED
turn off other 2 LEDs
set Mult reg to _Mult
set Samples128 to 128d
set Mult640 to _Mult640
reset all other registers
goto <Main>
```

FIG. 22H

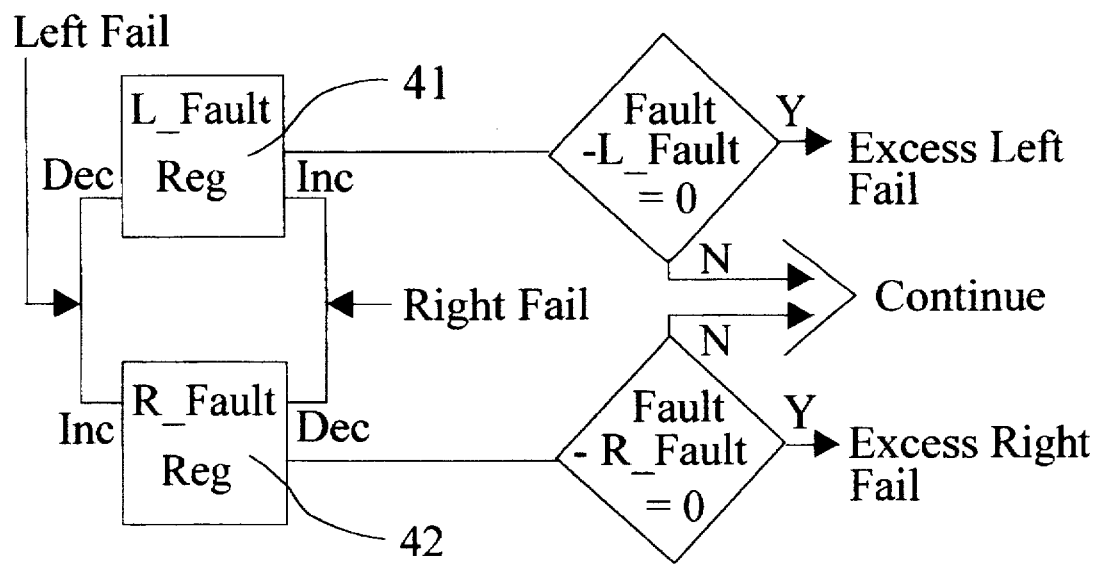

FIG. 23

VEHICLE STEERING OFFSET MONITOR

BRIEF DESCRIPTION OF THE INVENTION

1. Field of the Invention

This invention relates to devices used to detect an out-of-alignment condition of the wheels and/or other abnormal components that cause the vehicle to pull to one side or the other instead of going straight along the road.

2. Prior Art

The need for proper alignment between the vehicle wheels and the chassis of a vehicle has long been recognized. It is only when a proper aligned relationship is maintained that maximum tire wear and safe steering is achieved. Unfortunately, even normal driving can create alignment changes. Impact of the vehicle wheels against curbs, rocks, holes and the like may change the alignment of the wheels with respect to the chassis. If this changed alignment is not detected, and corrected at an early stage it may get progressively worse during the operation of the vehicle. This, naturally causes irregular and rapid tire wear that can be costly to the vehicle owner. Alignment changes may also result from worn pivot shafts, tie rod ends, ball joints and other parts. Detection of such worn parts can result in replacement before injury occurs from their excessive deterioration or failure.

In the past, out-of-alignment conditions of vehicle wheels with respect to the chassis has been detected primarily by observed uneven and irregular tire wear of the tires on the steered wheels, or by observed erratic steering of the vehicle. By the time either such observation is made it can be expected that the tires are badly worn.

OBJECTS OF THE INVENTION

It is a principal objective of the present invention to provide an easily observed means for determining an out-of-alignment condition, i.e., whether or not changes have occurred to the vehicle indicating an out-of-alignment condition due to that the wheels may have become misaligned relative to the chassis, or that defects in other components such as brakes, bearings or tires exist.

Other objectives are to provide means capable of indicating wheel misalignment, other undercarriage defects and uneven loading of vehicles with multiple wheels.

The invention can be an add-on to existing vehicles or can be factory installed during new vehicle production.

FEATURES OF THE INVENTION

Principal features of the invention include means to detect and indicate an out-of-alignment condition based on preset limits. The sensor unit has a central aligned condition for proper wheel alignment and offset out-of-aligned limits for an out-of-aligned condition.

In the first preferred embodiment of the invention the magnet is adapted to be fixed to the steering wheel hub of the vehicle and the sensor unit is adapted to be fixed to the steering column. This allows for an input to the central module that provides visual and audio data when the ratio between left and right steering duration exceeds a preset limit. This visual and audio response indicates a probable out-of-alignment adjustment and/or defective mechanical component.

This embodiment exists in two configurations. Configuration 1 is used to provide empirical data for the purpose of determining valid pass/fail limits to be used in the production unit configuration 2. These limits are further tested and validated by more empirical data gathered from known in-alignment and known out-of-alignment vehicles.

Configuration 2 will be marketed and used to alert the vehicle operator of a probable wheel out-of-alignment or mechanical defect.

Another preferred embodiment of the invention provides an analog indication of the status of the wheel alignment and/or of the vehicle undercarriage. A pointer is fixed to the steering wheel hub and a reference indicator is fixed to the steering column. When driving on a level road with no side forces the pointer will be in alignment with the indicator if the wheel alignment and undercarriage is acceptable. The reference indicator is adjustable and a preset tolerance is set and displayed by left and right adjustable markers adjacent to the center reference indicator marker.

THE DRAWINGS

In the drawings:

FIG. 10 is a layout drawing of the circuit board for the main module configuration 2.

FIG. 11 is an assembly drawing of the hall sensors and the circuit board.

FIG. 12 is an assembly drawing of the pointer and dial of another preferred embodiment of the invention.

FIG. 18 shows how the mult and numb 640 registers interact.

FIG. 19 is a failure requirement data table.

FIG. 20 shows the relationship of the mult register to the MSB, LSB and the total count.

FIG. 21 is a Flow Chart that shows the sequence of events and routing of the program flow during execution of configuration 1.

FIG. 22 is a Flow Chart that shows the sequence of events and routing of the program flow during execution of configuration 2.

FIG. 23 shows a diagram of L_Fault and R_Fault registers.

Figure 1:
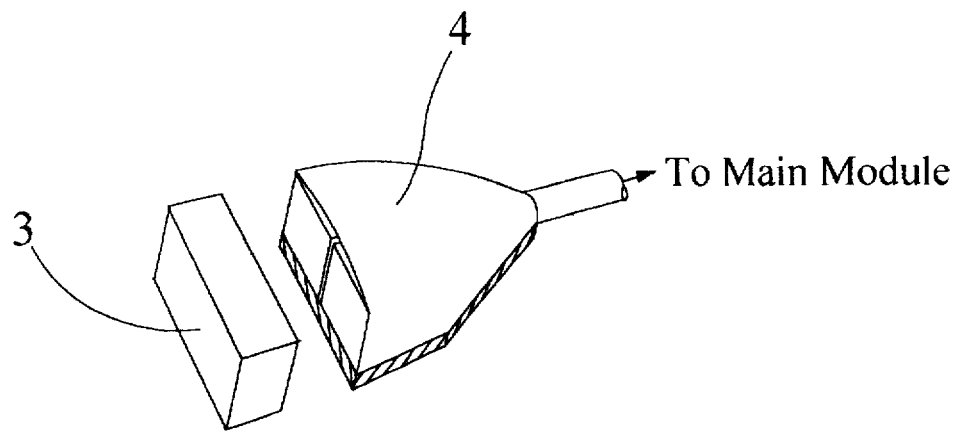
FIG. 1 is a perspective view of the sensor and magnet of the first preferred embodiment of the invention and is used with configurations 1 and 2.

Note: Flow chart (FIG. 21) and flow chart (FIG. 22) use the same basic software except the segment that controls the test fixture does not exist in flow chart (FIG. 22).

| Reference Numerals In Drawings | |
|---|---|
| 1 | left sensor HS1 |
| 2 | right sensor HS2 |
| 3 | magnet |
| 4 | sensor unit |
| 5 | steering column |
| 6 | steering wheel hub |
| 7 | nand latch IC U2 |
| 7a | nand latch left input |
| 7b | nand latch right input |
| 7c | nand latch left output |
| 7d | nand latch right output |
| 8 | microcontroller U1 |
| 9 | center led LED2 |
| 10 | left bi-color led unit LED3 |
| 10a | left red failure led LED3 |
| 10b | left green tracking led LED3 |
| 11 | right bi-color led unit LED1 |
| 11a | right red failure led LED1 |
| 11b | right green tracking led LED1 |
| 12 | piezo buzzer PZ1 |
| 13 | reset switch SW2 |
| 14 | self test switch SW1 |
| 15 | zener diode D1 |
| 16 | voltage regulator VR1 |
| 17 | crystal XTAL1 |
| 18 | shift register U3 |
| 19 | decoder U4 |
| 20 | decoder U5 |
| 21 | 7-segment display LED10 |
| 22 | 7-segment display LED11 |
| 23 | buffer U6 |
| 24 | 128 (R) red fail led LED4 |
| 25 | 128 (L) red fail led LED5 |
| 26 | 640 reg green led LED6 |
| 27 | mult LSB amber led LED8 |
| 28 | mult MSB amber led LED7 |
| 29 | piezo beeper PZ2 |
| 30 | display switch SW3 |
| 31 | reference indicator |
| 32 | pointer |
| 33 | adjustable center marker |
| 34 | L_samples register |
| 35 | R_samples register |
| 36 | samples 128 register |
| 37 | numb 640 register |
| 38 | mult register |
| 39 | center samples register |
| 40 | sensor unit power switch Q1 |
| 41 | L Fault register |
| 42 | R Fault register |
| 43 | misses register |

DETAILED DESCRIPTION OF THE INVENTION

Microcontrollers 8 and 8a (8a with fewer I/O) function basically alike.

Hardware Overview

Figure 5:
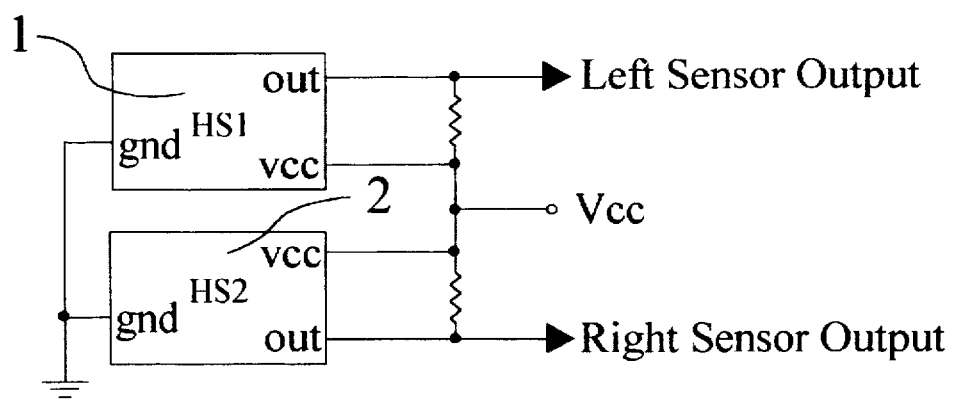
FIG. 5 is a schematic view of the sensor unit of the first preferred embodiment of the invention.

Sensor Unit FIG. 5:

In the first preferred embodiment of the invention in FIG. 5 the sensor unit 4 consists of a hall effect transistor 1 which senses the steering wheel entering and leaving the left of center position and a second hall effect transistor 2 which senses the steering wheel entering and leaving the right of center position. Each of these two transistors is triggered to the ON status by the proximity of magnet 3. The sensor unit 4 and magnet 3 are shown installed to the steering column 5 and the steering wheel hub 6 in FIG. 13. Magnet 3 is made of flexible material and can be cut to the desired size as will be discussed later.

Figure 6:
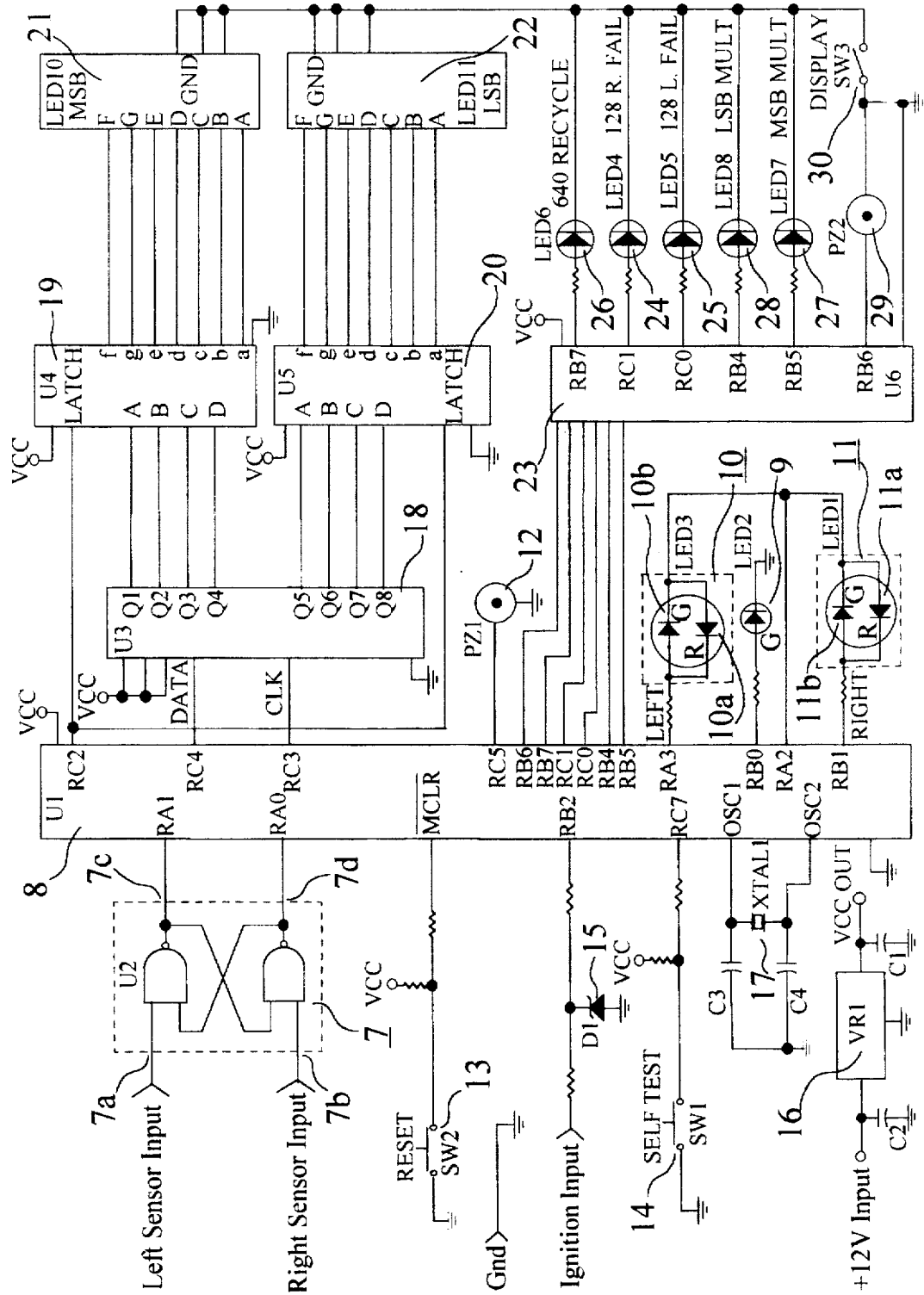
FIG. 6 is a schematic view of the main module and test fixture configuration 1 of the first preferred embodiment of the invention.

In the first preferred embodiment of the invention in FIG. 6 which is configuration 1, there are 2 sections on one printed circuit board (PCB): The Main Module section and the Test Fixture section. The Main Module in FIG. 7, which is configuration 2, is on one PCB. It will be sold to consumers and will not include the Test Fixture section. The pre-production configuration 1 includes the functions of the Main Module plus several other components (the test fixture) that will be used to provide data for evaluation of effective operation. Changes in the program based on this data, such as correct pass/fail settings can be done during the development stage.

Figure 7:
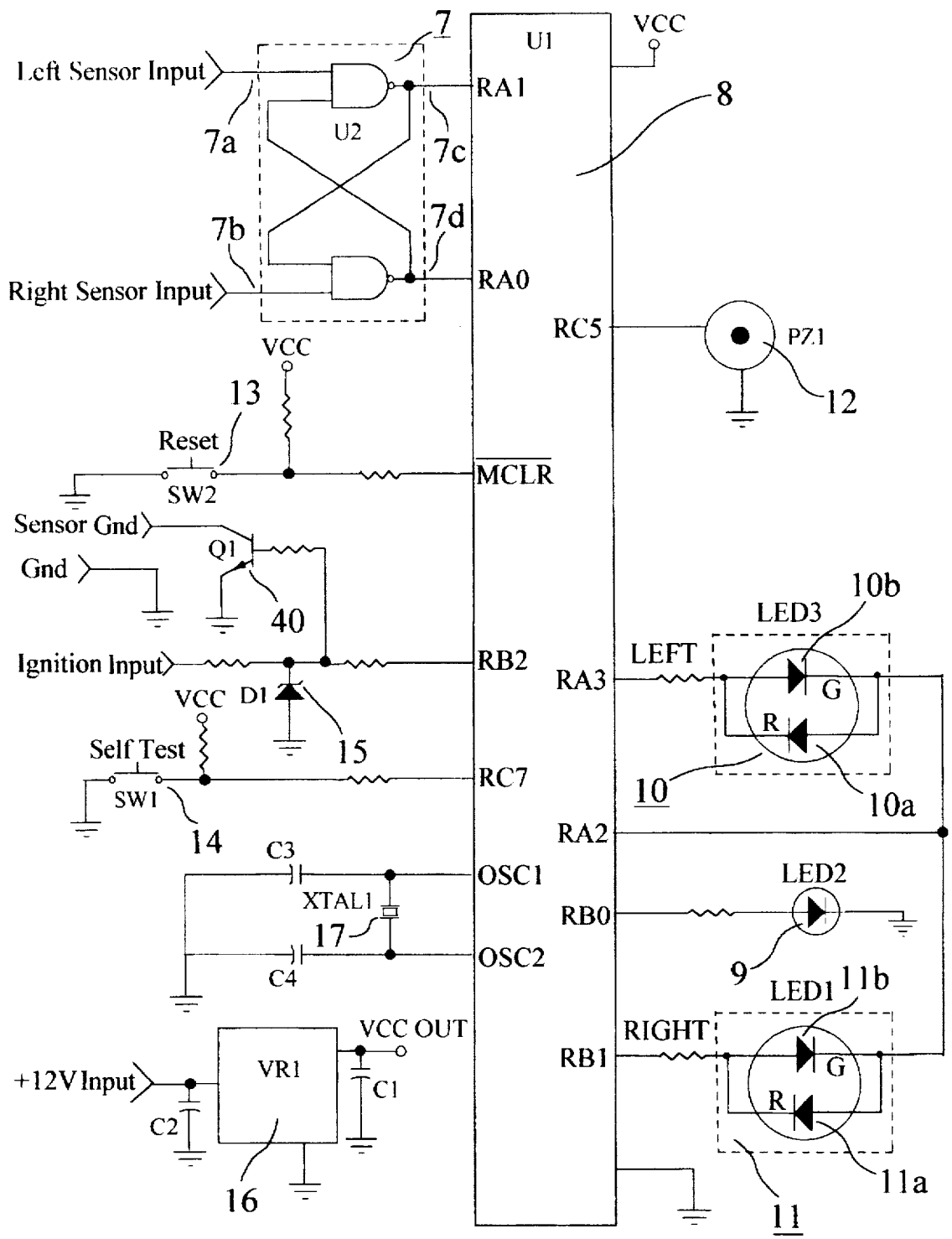
FIG. 7 is a schematic view of the main module configuration 2 of the first preferred embodiment of the invention.
Figure 8:
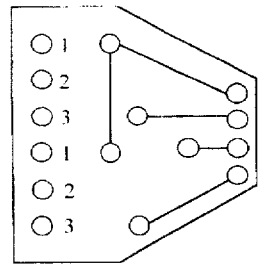
FIG. 8 is a layout drawing of the circuit board for the sensor of the first preferred embodiment of the invention.
Figure 8:
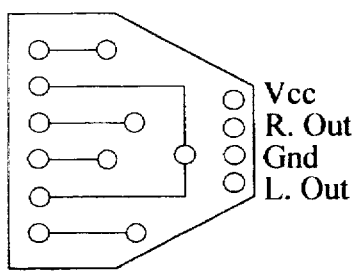

Main Module FIG. 6 and 7:

The main module consists of nand latch 7, microcontroller 8, one center position green light emitting diode (led) led 9, one left position green/red bi-color led unit 10, one right position green/red bi-color led unit 11, a piezo beeper 12, a reset switch 13, a self test switch 14, a 5 volt zener diode 15, a voltage regulator 16, a crystal circuit 17, transistor 40 (FIG. 7) and miscellaneous resistors and capacitors.

Test Fixture FIG. 6:

The Test Fixture section is supplied with counter values and status signals by microcontroller 8. The Test Fixture consists of a shift register 18, 2 each decoders 19 and 20, 2 each binary to 7-segment leds 21 and 22, a noninverting buffer 23, 5 each status leds 24, 25, 26, 27 and 28, a piezo beeper 29, a display switch 30 and miscellaneous resistors and capacitors.

Figure 4:
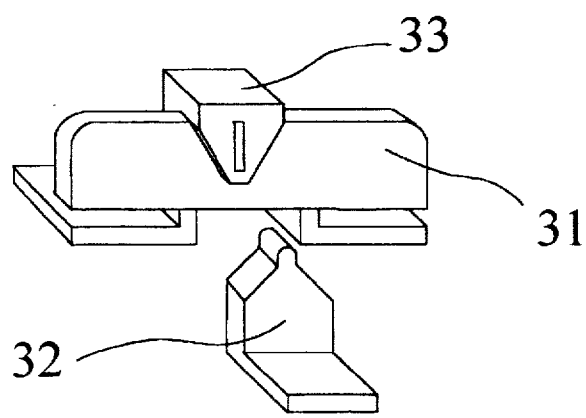
FIG. 4 is a perspective view of the pointer and dial of another preferred embodiment of the invention.

Another preferred embodiment of the invention shown in FIG. 4 consists of a pointer 32, a marker 33 and an reference indicator 31. FIG. 12 shows the pointer 32 mounted to the steering wheel hub 6 and the reference indicator 31 mounted to the steering column 5. Right and Left side limit markers can be added on each side adjacent to marker 33. These limit markers are not shown in the drawings but they would be a simple addition.

Operation Overview

The object of this invention is to warn the operator when the vehicle wheels need an alignment adjustment and/or the vehicle undercarriage components are out of proper operating tolerance. This applies to a vehicle with multiple wheels.

The above mentioned conditions and others such as a low tire can cause the vehicle to pull to one side when on a level road. To keep the vehicle on the road under these conditions the operator must turn the steering hub 6 to one side to compensate.

Figure 2:
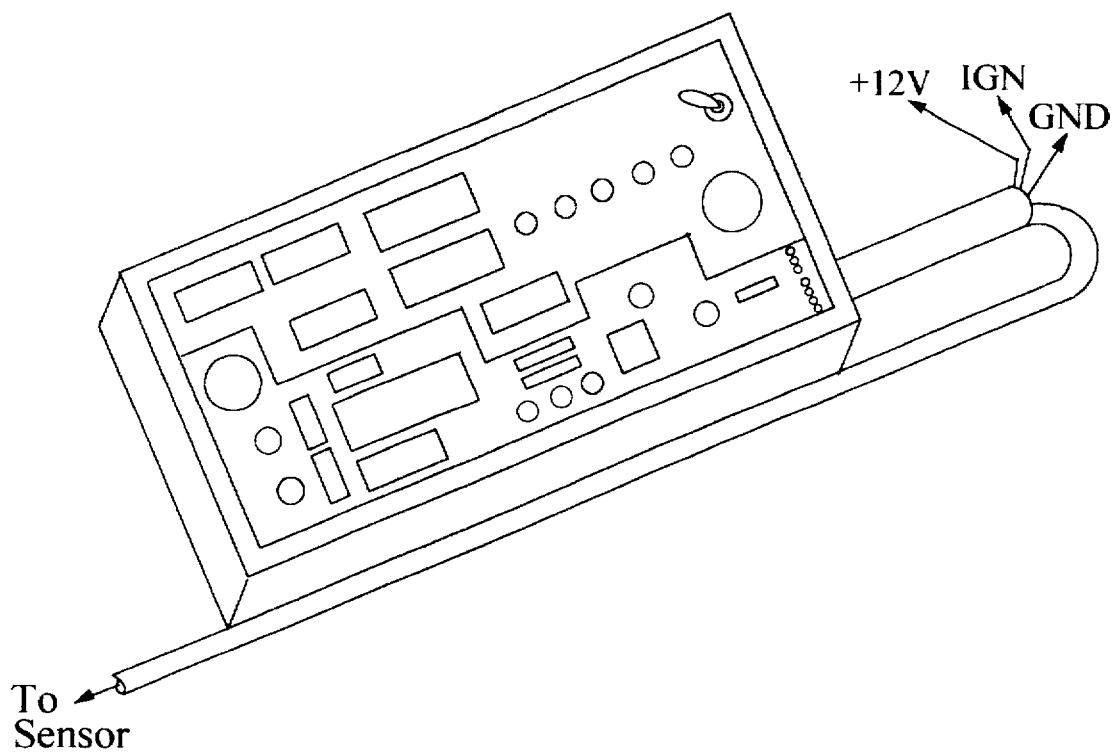
FIG. 2 is a perspective view of the main module and test fixture configuration 1 of the first preferred embodiment of the invention.
Figure 3:
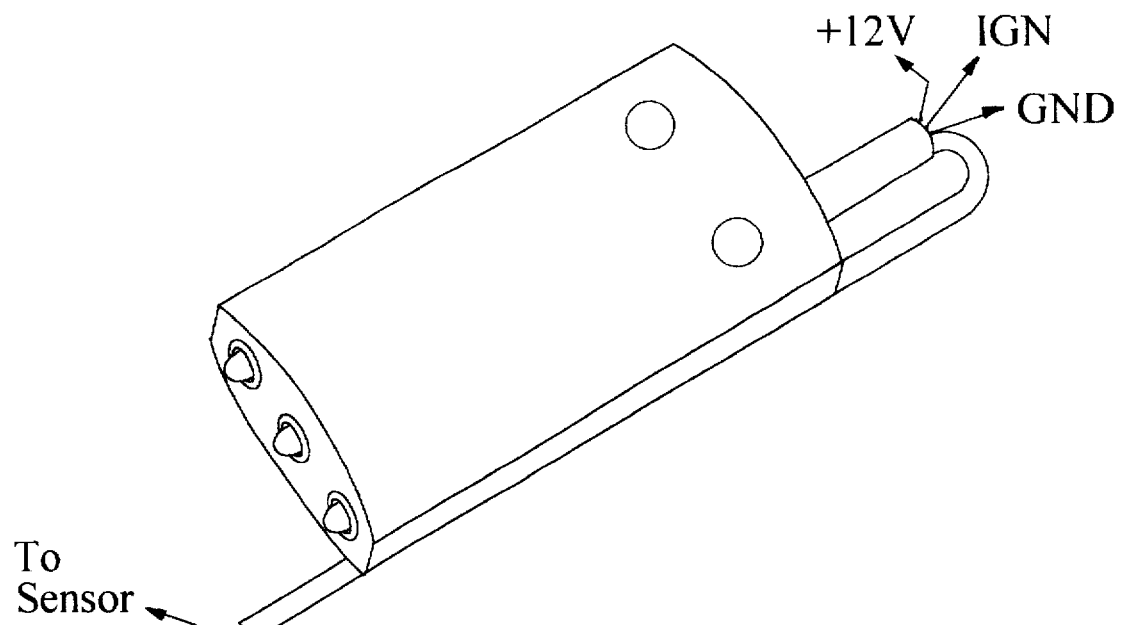
FIG. 3 is a perspective view of the main module configuration 2 of the first preferred embodiment of the invention.

The first preferred embodiment of the invention, configuration 1 shown in FIG. 2 and configuration 2 shown in FIG. 3 will automatically give the operator a warning when an excessive steering offset exists. The premise is that left and right side forces and turns will cancel each other over time. It looks for a constant steering offset.

Another preferred embodiment of the invention in FIG. 4 gives the operator an analog display of the steering offset. When using this unit the operator observes road conditions, side winds and other external forces that may cause the vehicle to pull to one side. If these external forces are negligible and this invention displays a significant misalignment between the pointer 32 and the indicator 33 the vehicle should at least be checked for proper wheel alignment.

Figure 9:
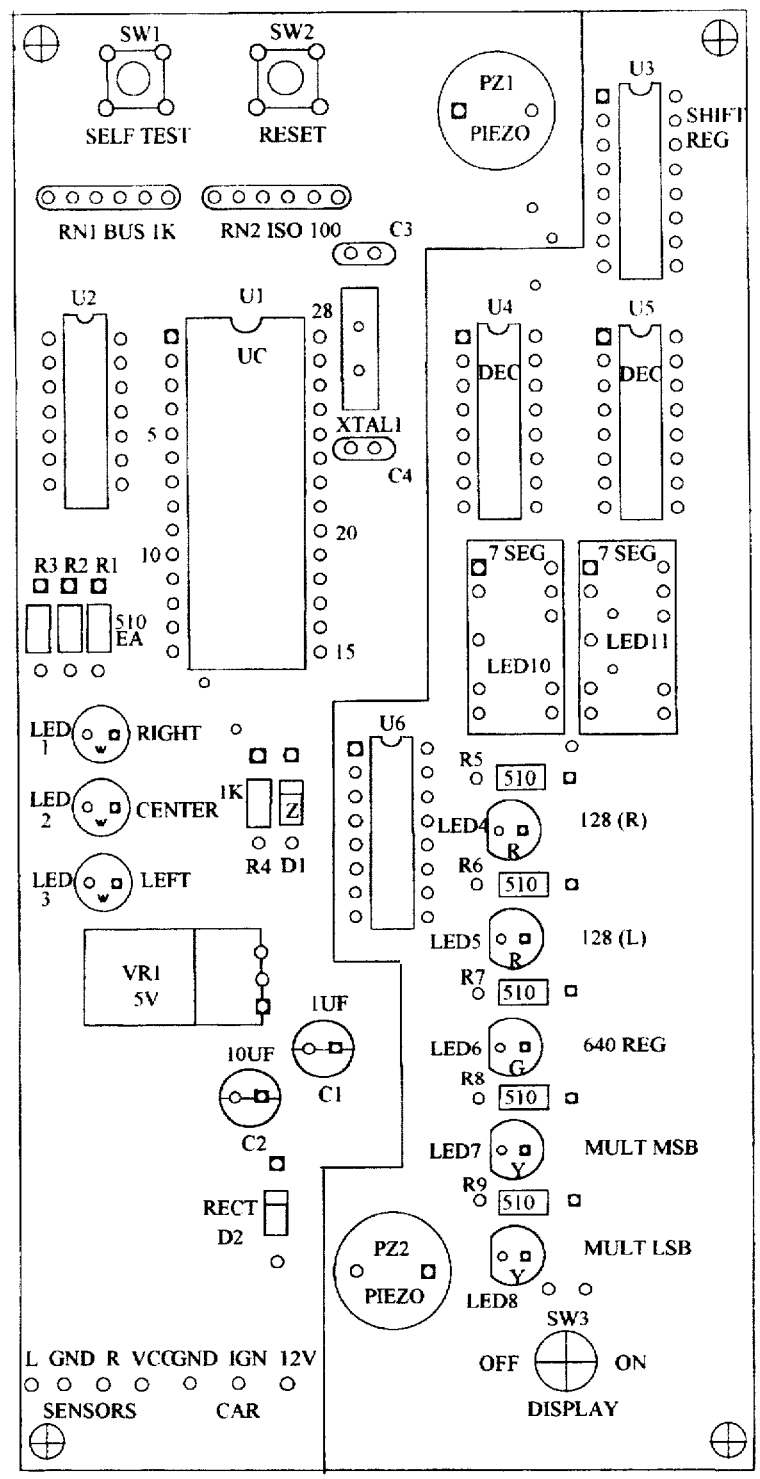
FIG. 9 is a layout drawing of the circuit board for the main module and test fixture configuration 1.

Main Module, Sensor Unit and Magnet:

The first preferred embodiment of the invention configuration 2 shown in FIG. 3, FIG. 7, FIG. 10 and FIG. 13 is the Main Module and will be sold to the consumer. Configuration 1 in FIG. 2, FIG. 6 and FIG. 9 consists of the Main Module and also the Test Fixture. The Test Fixture provides data during the testing phase.

The Main Module automatically provides the operator with an audio and visual warning when the steering hub 6 is offset to one side of center an excessive amount of time as compared to the other side. This excessive time difference between the left and right side of the vehicle steering is determined during the testing phase of development.

Nine of the registers which are part of microcontroller 8 are used for counting. They are identified by the following names: Mult, Misses, R_Samples, L_Samples, Samples 128, Numb 640, Fault, L_Fault and R_Fault. These registers are preset to specific numerical values by software variables at the beginning of a new test cycle.

Figure 15:
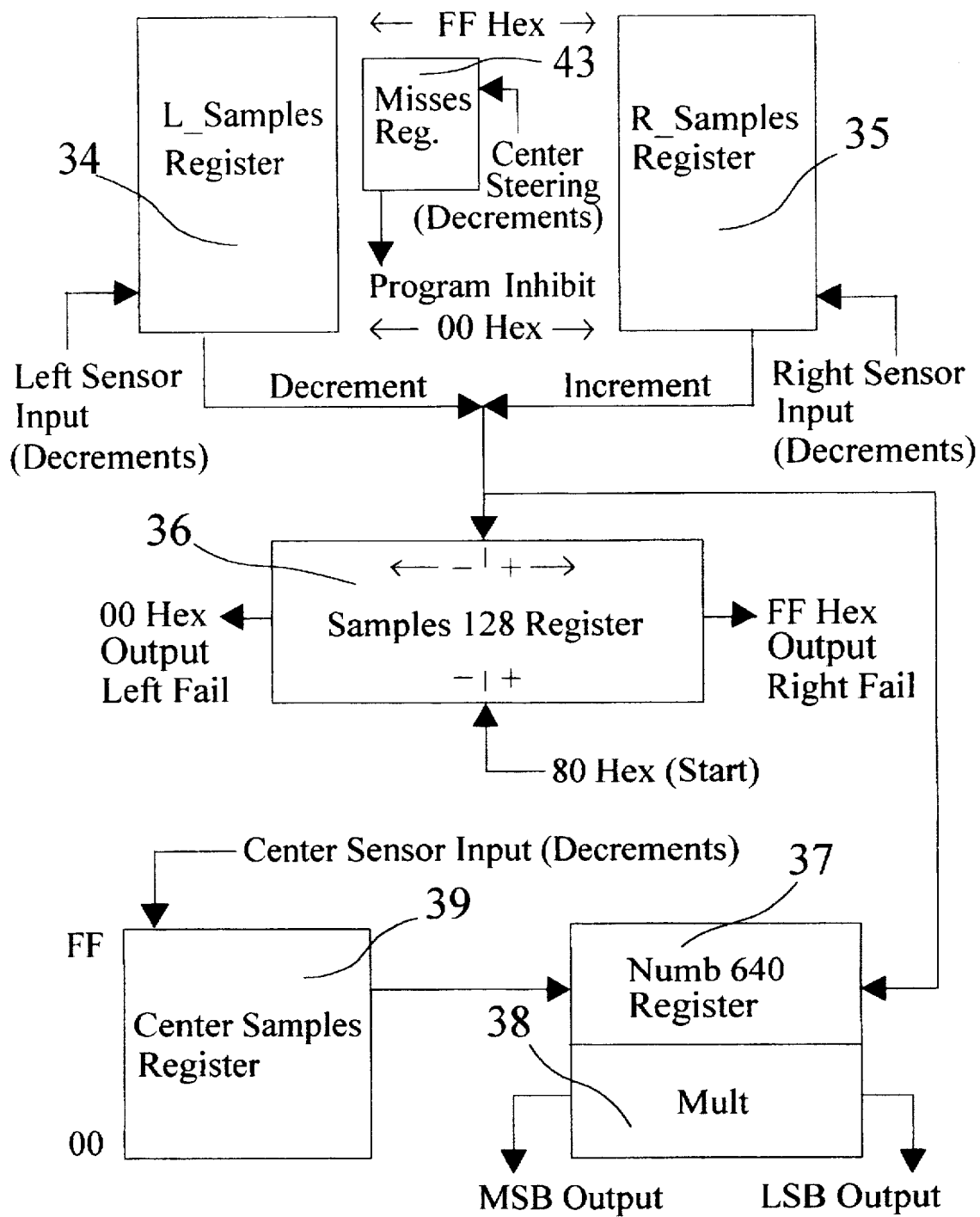
FIG. 15 is a block diagram of software function and the operation of the counting registers.

The Misses register 43 as shown in FIG. 15 is also preset to fifteen every time the vehicle ignition is turned ON. The microcontroller is inhibited from operation until the misses register 43 counts down to zero. Every time magnet 3 passes by sensor unit 4, through center, a down count is applied to the misses register 43. The misses register 43 provides for a no-sample condition when the vehicle is parked with the ignition on. Refer to the truth table and drawing of FIG. 16 for circuit operation.

Figures 16, 17:
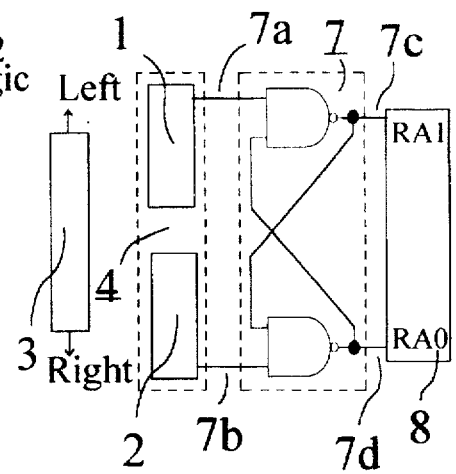
FIG. 16 is a truth table and drawing showing the relationship of the magnet and hall effect transistors.
FIG. 17 is a table showing the relationship of the inputs and outputs of the nand latch.

The sensor unit 4 in FIG. 16 contains hall effect transistors 1 and 2. When magnet 3 in FIG. 16 is centered in front of sensor unit 4, transistors 1 and 2 are both conducting. This provides a logic 0 (0 volts) to nand gate left input 7a and nand gate right input 7b.

All logic outputs from sensor unit 4 are fed to nand latch 7 at left input 7a and right input 7b. The outputs from nand latch 7 at left output 7c and right output 7d are fed to microcontroller 8 left input RA1 and 8 right input RA0. This logic flow can be seen by referring to FIG. 16 logic diagram and FIG. 17 truth table.

As the steering wheel hub 6 is turned, the magnet 3 passes on by the sensor unit 4. This causes a change in the outputs of transistors 1 and 2 which are connected to the inputs of the nand gates of Latch 7. As magnet 3 moves past sensor unit 4 the signal levels from both transistors 1 and 2 are stored by latch 7 until magnet 3 passes by sensor unit 4 again. There are three combinations of signals from the transistors 1 and 2 depending on the positioning of magnet 3.

NOTE: As shown in FIG. 6, FIG. 7 and FIG. 16

7 output 7c is connected to 8 input RA1

7 output 7d is connected to 8 input RA0

When magnet 3 is positioned left of sensor unit 4, 8 input RA1 is a logic 1 and 8 input RA0 is a logic 0. When magnet 3 is centered in front of sensor unit 4 8 input RA1 is a logic 1 and 8 input RA0 is a logic 1. When magnet 3 is positioned right of sensor unit 4, 8 input RA1 is a logic 0 and 8 input RA0 is a logic 1.

The Main Module responds to the stored sensor signals at 8 input RA1 and 8 input RA0, the ignition signal at 8 input RB2, the self test signal at 8 input RC7 and the reset signal at 8 input (not)MCLR.

The crystal controlled oscillator circuit 17 is connected to 8 osc 1 and 8 osc 2 and provides a 2 megahertz clock frequency.

The voltage regulator 16 supplies a +5 Vcc to all the applicable system components including those of sensor unit 4.

The center, left and right position of the steering wheel is displayed to the driver by tracking leds 9, 10b and 11b which receive signals from microcontroller 8 output RB0, 8 output RA3, 8 output RB1. Return for leds 10a, 10b, 11a and 11b is controlled by 8 output RA2.

The Main Module also provides the operator with an audio warning by supplying the piezo beeper 12 with a signal from 8 output RC5.

In the first preferred embodiment of the invention configuration 1 and 2 the block diagram of software function FIG. 15 shows the operation of the counting registers.

Hexadecimal, binary and decimal numbering systems are used in analysis and use of the system. Some of the common hex numbers used are: (00, 80, and FF). 00 hex=0 decimal (dec), 80 hex=128 dec and FF hex=255 dec.

Refer to FIG. 15 and FIG. 18 for the following program flow.

The L_Samples, Center and R_Samples registers 34, 39 and 35 are set to FF hex (255 dec). These registers are decremented by a left, center or right input. When the R_Samples register 35 reaches 00 hex (0 dec), the Samples 128 register 36 is incremented. When L_Samples register 34 reaches 00 hex (0 dec) the Samples 128 register 36 is decremented. When the Center register 39 reaches 00 hex (0 dec), the Numb 640 register 37 is decremented. When the Samples 128 register 36 reaches 00 hex (0 dec) or FF hex (255 dec) a failure has occurred.

Each time the Samples 128 register 36 is incremented or decremented the Numb register 37 is decremented. The Numb 640 register 37 and the Mult register 38 work together to count from 639 down to 0 dec. There are 639 samples taken in one test cycle. The Numb 640 register 37 is initialized to 213 dec and the Mult register 38 is initialized to 3. FIG. 18 shows the relationship and FIG. 15 shows circuit connection.

EXAMPLES

| | | | |
|---|---|---|---|
| |MSB led = ON(10) = 2| | |Display| |
| |LSB led = ON(01) = 1 | | | |
| | Mult = 3 dec | l, (0 to 213 range), | |40 dec | |
| this means there is 40 left of the 213 so: | | | |
| 213 − 40 = 173 counts so far. | | | |
| |MSB led = ON(10) = 2| | |Display| |
| |LSB led-OFF | | | |
| | Mult = 2 dec | l, (0 to 426 range), | |163 dec| | this means there is 163 left of the 426 so:

426−163=263 counts so far.

At the start of testing the total counts for one test cycle is set to 639 dec. If during the 639 count down the Samples 128 register 36 reaches 255 dec (128 dec at start+128 dec=255 dec) the operator is alerted to a right side steering domination. If during the 639 count down the Samples 128 register 36 reaches 0 dec (128 dec at start−128 dec=0 dec) the operator is alerted to a excess left steering.

Initially the tolerance is set to 20%. If 128 counts to one side (0 dec or 255 dec) of the Samples 128 register 36 occurs when 639 counts is reached the error is 20% (128/639=0.2= 20%). During the testing phase the 639 counts may be changed to a number other than 639 to achieve a different tolerance depending on when, in the test cycle a count of 0 dec or 255 dec of the Samples 128 register 36 is reached. If the 639 count is reached before the samples 128 register 36 reaches 0 dec or 255 dec there is no failure and a new test cycle is started. The system will continue until either the 639 count down is reached or a failure occurs.

The Fault, L_Fault 41, and R_Fault 42 registers are used to provide control of the number of left failures as compared to the number of right failures before the operator gets a warning. The Fault register is set to 3 which is the sum difference between right side and left side failures that initiates a warning. During the testing stage this number can be changed to a different value if after empirical data evaluation indicates it is necessary.

Reference is now made to FIG. 19 Data Table and FIG. 23 Logic Diagram. If a left side failure occurs the L_Fault register 41 is decremented and checked to see if 3 different from that of the Fault register. If the value in the L_Fault register 41 is decremented to 0 it will be 3 less than the value in the Fault register and a left side domination warning will take place. The left tracking RED led 10a will turn ON and piezo beeper 12 will beep. If the value in the R_Fault register 42 is decremented to 0 the excess right side failures equals the Fault register value. A right side dominant warning occurs. The right tracking RED led 11a will turn ON and piezo beeper 12 beeps.

The operator has been given and audio and a visual warning of a probable wheel alignment and/or an undercarriage problem. The system goes into the pause mode and will not continue until the reset switch 13 is pressed. The operator can start the system by pressing reset switch 13 at which time the system initializes and starts a new test.

The left side and the right side failures cancel 1 for 1. This means that if the accumulated number of failures in the L_Fault register 41 is greater than that of the R_Fault register 42 by the value in the Fault register (3 originally) a left side warning is given. The right side sequence uses the same format.

The following data table in FIG. 19 shows the relationship of incrementing and decrementing in the L_Fault 41, R_Fault 42 registers and the accumulated difference between them (if either =0 it fails).
Note:
  In test numbers 4 and 6 the failures completely cancelled to 0.
  In test number 9 there were no failures during the test cycle so the failure data did not change.
  In test number 10 the accumulated number of left failures=3 and L_Fault register=0. The 0 is what triggered the failure.
  In this example, 3 is the number of failures, either left or right required to warn the operator of a failure.

When a warning is given, the operator will check for obvious defects like a low tire or a brake dragging. If none are observed the operator can press the reset switch 13 and the system will be initialized and begin a new test sequence. If the same side failure occurs a second or third time the operator should take the vehicle in for a wheel alignment check and an undercarriage inspection. This will stop tire wear before it becomes excessive and also expose a possibly unsafe vehicle undercarriage.

Test Fixture:

As shown if FIG. 6, microcontroller 8 supplies a data signal from 8 output RC4 to shift register 18 input DATA and a clock signal from 8 output RC3 to 18 input CLK. The shift register 18 converts an 8 bit serial data signal at 18 input DATA into an 8 bit parallel data signal at 18 outputs Q1–Q8. The signals from 18 outputs Q1–Q4 are applied to decoder 19 inputs A–D inputs respectively and the signals from 18 outputs Q5–Q8 are applied to decoder 20 inputs A–D respectively. The signals from 19 outputs a–f are applied to the 7-segment display 21 at inputs A–F respectively and the signals from 20 outputs a–f are applied to the other 7-segment display 22 inputs A–F respectively.

As seen in FIG. 6 the buffer 23 receives a 640 Reg signal from microcontroller 8 output RB7, 128 (L) signal from 8 output RC0, a 128 (R) signal from 8 output RC1, a Mult MSB signal from 8 output RB5, Mult LSB signal from 8 output RB4 and a piezo beeper signal from 8 output RB6.

The 640 Reg green led 26 provides status of the Numb 640 register 37. ON if last test cycle was completed with no failure. The 128 (R) red led 24 provides status of the Samples 128 register 36. ON if right side failure occurs. The 128 (L) red led 25 provides status of the Samples 128 register 36. ON if left side failure occurs. See FIG. 15 and 20, the Mult MSB amber led 27 provides status of the Mult register 38. ON if count is from 0 to 426 when a failure occurred. The Mult LSB amber led 28 provides status of the Mult register 38. ON if count is from 0 to 213 or 427 to 639 when a failure occurred.

Refer to FIG. 15 and FIG. 20 to see the register relationships. The audio warning is sounded by piezo beeper 29. Buffer 23 is the driver for the 5 leds and 1 piezo beeper. The MSB and LSB status are displayed in binary.

EXAMPLES

MSB led=on, LSB led=on
  11 binary=3 dec. This means the count was in the 0 to 213 range when the failure occurred.
MSB led=on, LSB led=off
  10 binary=2 dec. This means the count was in the 214 to 426 range when the failure occurred
  NOTE: FIG. 18 and examples show how the count is derived.

This initial value of 639 may be changed during the testing stage when empirical data is gathered and evaluated. The 639 count is a variable and helps control the correct point at which to warn the operator of a probable problem.

The display switch 30 provides a ground circuit for the two 7-segment displays and the status leds when in the ON position. When switch 30 is set to the ON position the test data will be displayed for evaluation.

First preferred embodiment configuration 1. This configuration consists of the Main Module and the Test Fixture on one circuit board and is used during the test development stage. Refer to FIG. 6. and FIG. 15.

Pass mode of configuration 1 (Main Module and Test Fixture-one PCB):

If there is no failure during the 640 counts, piezo 29 will beep and data will dump from the samples 128 register 36 at the end of the test cycle. This data will be in hex and the 2 each 7-segment led displays show the MSB on 21 and the LSB on 22. The reading is recorded and converted to decimal.

EXAMPLE 21 and 22 display C8 hex=200 dec

Before the test the reset switch 13 is pressed and the samples 128 register 36 is set to 80 hex=128 dec.

If after 640 counts the reading is 128 dec there is no left or right side steering domination.

A count of 128 either side of the reference of 128 will cause a failure and a warning will be produced.

128 ref.+128=255 right fail 128 ref.−128=0 left fail

The reading of 200 dec is greater than the 128 ref. so there is a slight right side steering domination.

Calculations:

(dec. reading)−(128 ref.)+/−(dominant steering) (+=right side) (−=left side)

200−128=+72 right side steering domination Amount: 72/640=0.1125 11.25%

The results represents a domination of left or right steering. A (−) number below 128 indicates the steering is left of center most of the time. A (+) number greater than 128 indicates a right side steering domination. The larger the displacement from the starting reference of 128 dec the greater the steering error. The system begins a new test cycle and retains the last data for display until this new test cycle is complete. At this time new data replaces the old. This data helps to determine the pass/fail threshold during the testing phase. The operator can observe the data by setting the display switch to the ON position.

Pass mode of configuration 2 (Main Module, one PCB):

The same as configuration 1 except the Test Fixture section and it's functions are not present.

There is no notice to the operator when a test cycle is completed and passes (samples 128 register did not reach either limit). The way the operator knows the system is operating, without doing a self test, is to observe the steering wheel hub 6 tracking leds 9, 10b and 11b. When the vehicle ignition is turned ON and the required misses are passed these leds display the location of the steering wheel hub 6. They show three positions; left, center and right.

Failure Mode of configuration 1:

Test Fixture function;

If there is a failure during the 639 counts, piezo 29 beeps and data will be displayed by use of the 7-segment displays 21 and 22 and also mult MSB led 27, mult LSB led 28, 128(L) led 25 or 128(R) led 24. Refer to FIG. 18, FIG. 20 and also the examples that follow the figures. This information helps to determine the pass/fail threshold.

Main Module function;

Tracking led units 10 and 11 continue to display the position of the steering wheel hub 6 until a maximum number of one side failures occur (3 unless changed ). At this time piezo 12 beeps, bi-color led unit 10 will glow red if there is a left failure and bi-color led unit 11 will glow red if there is a right failure. The system pauses and waits until the reset switch 13 is pressed. Failure mode of Configuration 2:

The same as configuration 1 except the Test Fixture and it's functions are not present. Feedback to the operator occurs when the accumulated difference total of one side failures of L__Faults or R__Faults registers as compared to the Fault register value (3 if unchanged). At this time piezo 12 beeps, bi-color led unit 10 will glow red if left failure, and bi-color led unit 11 will glow red if right failure. The system pauses until the reset switch 12 is pressed.

Self Test:

The self test function is useful if correct operation of the system is in question.

When in the self test mode the system runs at a much higher rate. The 62 ms and 4 ms sample delays are bypassed in configuration 2 and the time for one test cycle is 2.0+/−0.5 seconds instead of 36 minutes at normal speed. These times are based on a constant side steering offset. The system functions the same as when in the normal mode. In configuration 1 there is a 4 ms sample delay when running self test. This delay slows the self test down to 2 minutes. This slower speed allows for possible data retrieval by use of a timer.

As shown in FIG. 6 and FIG. 7, by holding the self test switch 14 down a logic 0 is applied to microcontroller 8 input RC7. The program now has no sample delay in configuration 2 and the system speed is determined by crystal 17 operating at 2 mhz. In configuration 1 there is a 4 ms delay that slows the self test.

To use the self test option press reset switch 13. Set display switch 30 to ON. Set the steering wheel hub 6 to the desired position. Press and hold self test switch 14 until test is complete. The self test option is used to quick test any function for proper operation.

Ignition:

The vehicle ignition switch supplies the voltage to microcontroller 8 input RB2. The ignition voltage can have voltage spikes so the zener diode 15 as shown in FIG. 6 and FIG. 7, is used to limit the voltage applied to 8 input RB2 to +5 volts maximum. The ignition voltage controls system operation. When the ignition switch is turned ON the misses routine is initiated. After meeting the misses requirements the system is in full operation until the ignition switch is turned OFF. At this time the microcontroller memory is maintained, leds are turned OFF and the system waits for the ignition switch to turn ON again. In configuration 2 sensor power is removed by transistor 40 when the ignition switch is OFF.

Voltage Regulator:

Refer to FIG. 6 and FIG. 7. Voltage regulator 16 receives voltage from the vehicles main power source. The voltage is applied to the regulators inputs at all times. The output of voltage regulator 16 is regulated to a +5 volt DC level and is used by the system. Microcontroller 8 Software Program Flow:

Refer to the Flow Chart in FIG. 21 for configuration 1:
<Start>

When power is applied, the microcontroller 8 starts at address <Start>. All variables are initialized and the outputs are set to OFF. Calls <Alloff> and goes to <Main>.
<Alloff>

Turns all leds and all piezos off (de-asserts ports) and returns to where it was called from.
<Main>

In <Main> the vehicle's ignition is tested. If the vehicle's ignition is Off the program jumps to <Ignition>. Self Test is then tested and if asserted, the 62 ms and 4 ms delays are bypassed in configuration 2. In configuration 1 there is a 4 ms delay. The self test reduces the program execution time. If not asserted calls <Delay62> and <Delay4>.

The steering sensor unit 4 is sampled. If sensor unit 4 indicates a centered position of steering wheel hub 6 the center register is decremented. If sensor unit 4 indicates a right or left steering hub 6 position the program goes to the <DecR__Samples>sequence or the <DecL__Samples>sequence respectively. If the center register equals 0 the program goes to <Section 5>.

21 Delay62>

Program loops for 62 ms and returns to where it was called from.
<Delay4>

Program loops for 4 ms and returns to where it was called from.

21 Delay1S>

Program loops for 1 or 2 seconds depending on program and then returns to where it was called from.
<Ignition>

In <Ignition> the program checks to see if the self test button 14 is pressed. If the self test button 14 is pressed <Ignition> is bypassed and the program goes directly back to <Main>.

The program then checks to see if ignition is logic 0 (OFF). If ignition is a logic 0 the program goes to <IgnOff> where it waits for ignition to change to a logic 1. If ignition changes to a logic 1 (ON), the sensor unit 4 outputs are monitored. The sensor unit 4 outputs are allowed to change 15 times before any samples are counted. This allows the driver to exit the driveway and begin to drive before any samples are taken. The program flows to <Main>.
<DecR_Samples>

In the <DecR_Samples> the right bi-color tracking led 11 is set to green. The R_Samples register 35 is decremented. If the R_Samples register 35 equals 0 the program increments the Samples 128 register 36 and goes to <Section5>. If the R_Samples register 35 does not equal 0 the program goes back to <Main> and takes another sample of the outputs of sensor unit 4.
<DecL_Samples>

In the <DecL_Samples> the left bi-color tracking led 10 is set to green. The L_Samples register 34 is decremented. If the L_Samples register 34 equals 0 the program decrements the Samples 128 register 36 and goes to <Section5>. If the L_Samples register 34 does not equal 0 the program goes back to <Main> and takes another sample of the outputs of sensor unit 4.
<Section5>

In <Section5> the Numb 640 register 37 is decremented. If the Numb 640 register 37 equals 0 the Mult register 38 is decremented and the Numb 640 register 37 is set to 213 dec. If Numb 640 register 37 does not equal 0 the program goes to <Test128>. If the Mult register 38 equals 0 before a failure occurs the program goes to the <Completed> section.
<Test128>

If the Samples 128 register 36 equals 0 dec a left side failure has occurred and the program clears the MSB of the Stores register and goes to <SetUp>. If the Samples 128 register 36 equals 255 dec a right failure has occurred and the program sets the MSB of the Stores register and goes to <SetUp>. Otherwise the program goes to <Main>.
<SetUp>

If <SetUp> is executed a failure has occurred. The MSB of the Store register determines if the failure is left (MSB=0) or a right failure (MSB=1). <SetUp> asserts the Test Fixture piezo 29, the status leds and dumps the value of the Numb 640 register 37 to the 7-segment leds 21 and 22 of the Test Fixture. Then, depending on the MSB being either a 1 or 0 in the Store register the program goes to either <Left> or <Right>.
<Left>

In <Left> the Test Fixture status 128 (L) led 25 is asserted. The R_Faults register 42 is incremented. The L_Faults register 41 is then decremented. The limit value of the accumulated difference in failures between the one side as compared to the other side is determined by the value of the Fault register (3 originally). A running total of this difference is updated. If the L_Faults register 41 is decremented to the value of 0 the program asserts the red tracking led 10a and goes on to <Failure>. If L_Faults register 41 is not equal to 0 the program goes on to the <Main> section.
<Right>

In <Right> the Test Fixture status 128 (R) led 24 is asserted. The L_Faults register 41 is incremented. The R_Faults register 42 is then decremented. The limit value of the accumulated difference in failures between the one side as compared to the other side is determined by the value of the Fault register (3 originally). A running total of this difference is updated. If the R_Faults register 42 is decremented to the value of 0 the program asserts the red tracking led 11a and goes on to <Failure>. If R_Faults register 42 is not 0 the program goes on to <Main>.
<Failure>

After a failure has occurred and the status leds are asserted, <Failure> stores the (ON, OFF) state for the status leds. The program flows on to <Fail>.
<Fail>

In <Fail> the main module piezo 12 is asserted. The stored state of the status leds is recalled and the status leds are asserted to that previous state for observation and analysis by the driver. The program flows on to <Ign3>.
<Ign3>

The program loops in <Ign3> until the Ignition is turned OFF. When the Ignition is turned OFF the Main Module tracking leds 9, 10b and 11b are turned OFF.

If the program is in the failure mode the reset switch 13 must be pressed in order to start another test cycle. Otherwise the program flows on to <Ign4>.
<Ign4>

The program loops in <Ign4> until the Ignition is turned ON. When the Ignition is turned ON it is checked for a glitch (voltage spike) and if detected the program loops back to <Ign4>. If there is no glitch the Misses 43 register is set to 15. The program then flows on to the <Ignition2> section.
<Ignition2>

In <Ignition2> the program loops until the Misses register 43 has been decremented to 0. When the misses register 43 equals 0 the program goes to <Fail> where the failure status is displayed to the operator and the program pauses until the reset switch 13 is pressed.
<Dump2>

If MSB equals 1 the program sends data to the Test Fixture, resets registers, presets select registers and goes to <Main>.
<Completed>

The program turns OFF all leds, asserts Test Fixture piezo, 640 led and calls <Dump2>. Resets all registers, presets registers Eight, Mult, Samples 128, Mult 640 and goes to <Main>.

Refer to FIG. 22 Flow Chart (for configuration 2):

This configuration does not contain the Test Fixture section and the program is similar to the Main Module section of configuration 1.

The description of the program flow is included at the left side of the flow chart.

Installation of the first preferred embodiment of the invention:

Configuration 1 (Main Module and Test Fixture on one Printed Circuit Board (PCB)).

Figure 13:
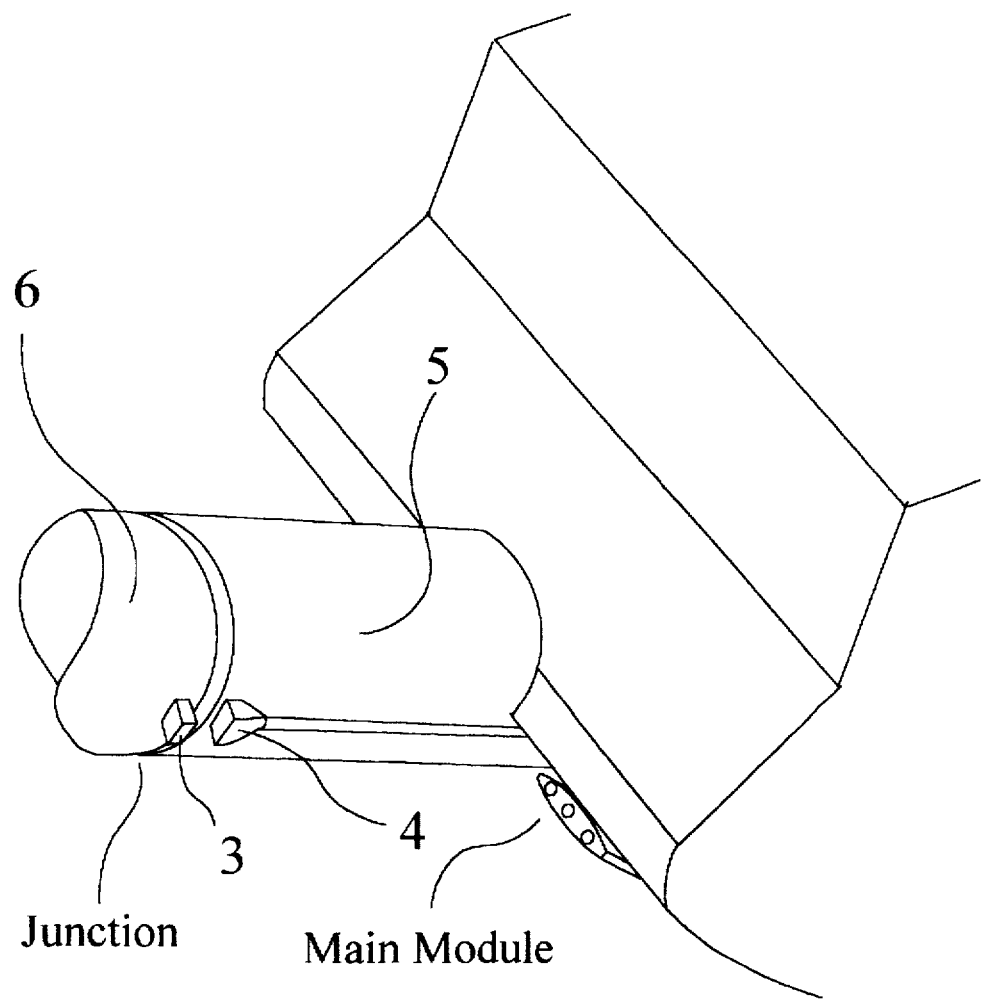
FIG. 13 is an assembly drawing of the main module, sensor unit and magnet of configuration 2 of the first preferred embodiment of the invention.
Figure 14:
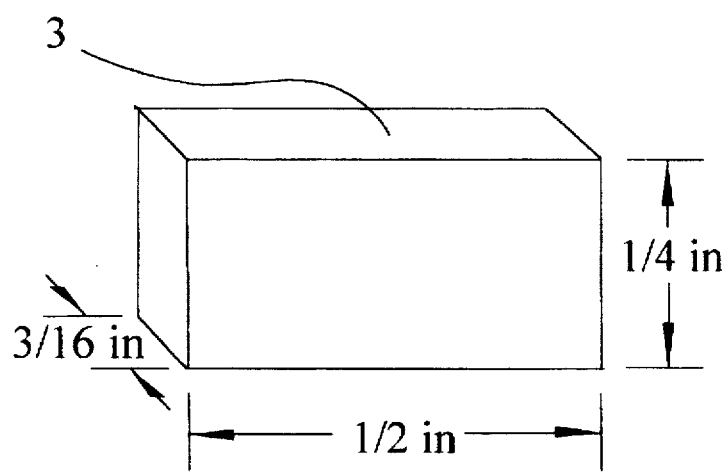
FIG. 14 is a dimensional drawing of the magnet used with both configurations 1 and 2 of the first preferred embodiment of the invention.

This configuration is only used to collect empirical data. The PCB assembly shown in FIG. 2 can be mounted at any convenient location with easy access. FIG. 13 shows configuration 2 installed. Use this Figure as a reference. The sensor unit 4 is mounted as shown in FIG. 13. The magnet 3 will be mounted later. Mounting can be done using 2-way tape or velcro.

Have a wheel alignment performed on a mechanically sound vehicle. While still connected to the alignment machine and with the engine idling set the steering to a straight ahead position. Apply a blank address label or the equivalent to the steering hub 6 and another label to the column 5 lined up with each other at the junction point. Mark a straight line perpendicular to the junction of the steering hub 6 and column 5. Turn steering wheel left until the steered wheel or wheels just start to move. Mark a line on the column 5 that is in alignment with the line on hub 6. This is the left reference line for left turning. Repeat this procedure only turn to the right. There are now three reference lines on column 5. One at center, one left of center and one right of center. The distance between the left and right side lines shows the steering play. The length of magnet 3 will be tailored to ignore this area.

Drive the vehicle on a straight and level road under ideal conditions. With the vehicle moving straight ahead mark a new center reference line of a new color on column 5 that lines up the with the line on the steering hub 6. This new line considers the natural drift of the vehicle. Offset the left and right lines to agree with the offset of the new center reference line. Normally this will be a slight amount. Make new left and right lines based on left and right steering action of the vehicle while in motion at normal speed.

Mount magnet 3 with 2-way tape to hub 6 as shown in FIG. 13. Cut magnet 3 to a length so that tracking led 9 is ON during the time the steering wheel hub 6 reference line is between the new left and right reference lines. This disables the system during the time when the steering wheel is ineffective.

Testing Phase (Gather empirical data for evaluation):

Drive a long enough distance under ideal conditions so that the system recycles upon completion of the round trip. The results should show a small degree to one side.

The premise of this system is that over time side forces will be equal and opposite and left and right turns will cancel. A realistic tolerance must be established during the testing stage to mask out the inherent imbalance.

Have the vehicle alignment set out of tolerance to one side just enough to wear the tires but not enough to be noticeable to the average driver.

Take the same trip as before under ideal conditions and hope for a failure on the correct side upon completion. If this happens the 20% one side time domination programmed in is correct. If a failure occurs early the Numb640 limit can be lowered or the magnet made longer. If the failure does not occur the Numb 640 limit is raised or the magnet shortened. The object is to get a failure close to the completion of a test cycle. This then allows us to use the 128 left or right count limit to calculate the tolerance percent based on the total counts for one test cycle.

The data collection will be gathered and evaluated using at least 5 vehicles, each driven on different roads. There is 5 individual configuration 1 test units used in the collection of empirical data. When all data is accepted as satisfactory the final and most realistic values for Numb 640 and Mult registers will be programmed and an average magnet size will be established.

Configuration 2 (Main Module):

This configuration of the first preferred embodiment of the invention is the production unit.

The final test cycle duration count derived during the testing stage will be programmed into the microcontroller 8 and will be verified to function as expected in this configuration. This module along with sensor unit 4 and custom magnet 3 will be installed as shown in FIG. 13. Two test vehicles will be used to exercise the system to insure proper operation and effectiveness.

Configuration 2 with sensor unit 4 and magnet 3 along with the required documentation will then be marketed to the public.

Installation of another preferred embodiment of the invention:

As shown in FIG. 12 the pointer 32 is shown mounted to the steering hub 6. The indicator 31 is mounted to the column 5. These units are held by 2-way tape. Marker 33 is centered on indicator 31.

During the vehicle wheel alignment the wheels are set to the straight ahead position. The indicator is mounted in a selected location on column 5. The pointer 32 is mounted in straight alignment with the marker 33 as viewed from the operator's location. If the side reference markers are to be used they would be installed now.

The alignment specialist would position the left and right side markers at a point that represents an out of alignment condition.

Use of the analog unit:

If during the operation of the vehicle the pointer 32 is out of alignment with the center marker 33 the operator must do an evaluation. The thing to consider is how far to one side of the marker 33 the pointer is as compared to the external forces such as a side wind. Some things to check would be a low tire and any other obvious thing that would cause the steering offset. If no problem is found then the vehicle would be taken in for a wheel alignment check.

SUMMARY, RAMIFICATIONS, AND SCOPE

Accordingly the reader will see that the steering offset monitor of this invention can make early detection of vehicle wheel alignment error and undercarriage deterioration. Realizing these conditions are unsafe and can lead to high maintenance costs makes this invention a valuable contribution to safer and more efficient travel. Furthermore, the most preferred configuration of the steering offset monitor has the additional advantages in that

- it requires no manual intervention in normal operation and only alerts the driver if there is a probable steering problem;
- it can be used on a variety of vehicles having a plurality of wheels;
- it is operated by microcontroller software that provides the capability of upgrading the system operation later if required;
- it uses operational parameters that are based on empirical data that has been collected and optimized for reliable, effective and repeatable operation;
- it can be programmed to have peak effectiveness in specific applications such as town driving as compared to long freeway trips like those of the trucking industry; and
- it has a self test feature that allows the operator to verify correct system operation within 3 seconds.

While the above description contains many specificities, these should not be construed as limitations on the scope of the invention, but rather as an exemplification of some of the presently preferred embodiments of this invention. Many other variations are possible. For example, sampling based on distance traveled rather than time interval. A small push button unit mounted on the steering wheel that provides steering offset status when the button is pressed. An alignment decal that gives reference marks of steering offset that can be applied and used as a manual indicator. Units emitting a light beam to a reference indicator to be used in applications where visibility is restricted. Special designed units to fit on motorcycles and bicycles to detect rear wheel misalignment. Voice communication capability. An automatic system that incorporates analog means.

Thus the scope of the invention should be determined not by the embodiments illustrated, but by the appended claims and their legal equivalents.

We claim:

1. An apparatus for detecting an out-of-alignment condition of a wheeled vehicle with at least one steered wheel

15 controlled by a steering wheel by comparing the relative number of periodic samples during a sampling period in which the vehicle steering wheel is positioned right of the center position as compared to left of the center position, the apparatus comprising;

sampler that periodically samples the position of the steering wheel and determines whether the steering wheel is in a center position, or a left position left of the center position, or a right position right of the center position, fault determiner that determines a left fault condition when the number of samples in the left position exceeds the number of samples in the right position by a first predetermined number during the sampling period, or determines a right fault condition when the number of samples in the right position exceed the number of samples in the left position by the first predetermined number during the sampling period, auto-reset that initiates a new sampling period when a left fault condition is determined, or a right fault condition is determined, or the number of samples made by the sampler during the sampling period reaches a second predetermined duration number, a status indicator that indicates to a user a left failure or a right failure based upon a comparison of accumulated right fault conditions and accumulated left fault conditions over one or more sampling periods.

2. An apparatus as in claim 1 wherein the ratio of the first predetermined number to the second predetermined number is about 20%.

3. An apparatus as in claim 1 wherein the sampler comprises;

a stimulus attached to a rotatable together with a steering hub of the steering wheel sensing system stationary with a column of the steering wheel such that the sensing system can determine a center position, left position, or a right position based upon the relative position of the stimulus with the sensing system.

4. An apparatus as in claim 3 additionally comprising a manual reset that initiates a new sampling period and resets the registers to initial values upon manual activation by the user.

5. An apparatus as in claim 3 wherein the stimulus comprises a magnetic material and the sensor comprises magnetic sensors.

6. An apparatus as in claim 1 wherein the fault determiner comprises a status register that is incremented when a sample is in the left position and decremented when a sample is the right position and a left fault condition is determined when the status register reaches a number that is equal to a initial value in the register plus the first predetermined value, and a right fault condition is determined when the status register reaches a number that is equal to the initial value in the status register minus the first predetermined value, and the auto-reset resets the status register to the initial value.

7. An apparatus as in claim 1 wherein the fault determiner comprises a status register that is decremented when a sample is in the left position and incremented when a sample is the right position and a left fault condition is determined when the status register reaches a number that is equal to a initial value in the register minus the first predetermined value, and a right fault condition is determined when the status register reaches a number that is equal to the initial value in the status register plus the first predetermined value, and the auto-reset resets the status register to the initial value.

16

8. An apparatus as in claim 1 wherein the status indicator indicates a left failure when the accumulated number of left fault conditions exceed the accumulated number of right fault conditions by a third predetermined number, and the status indicator indicates a right failure when the accumulated number of right fault conditions exceed the accumulated number of left fault conditions by the third predetermined number.

9. An apparatus as in claim 1 additionally comprising a system pauser that pauses the operation of the fault determiner upon ignition activation and resumes the operation of the fault determiner after a predetermined fourth number of center positions have been sampled by the sampler.

10. An apparatus as in claim 1 wherein the sample comprises a left position sensor and a right position sensor, the sampler determining a center position when both sensors are activated, determining a left position when the left sensor is activated and the right sensor is not activated, determining a right position when the right position is activated and the left sensor is not activated, when both sensors are not activated the sampler determining a same position that was determined immediately before both sensors became not activated.

11. An apparatus as in claim 1 wherein the sampler periodically samples the position of the steering wheel at a constant preset time interval.

12. An apparatus as in claim 1 wherein the sampler periodically samples the position of the steering wheel at an interval based upon distance of vehicle travel.

13. A method for detecting an out-of-alignment condition of a wheeled vehicle with at least one steered wheel controlled by a steering wheel, the method comprising;

comparing the relative number of periodic samples during a sampling period in which the vehicle steering wheel is positioned right of the center position as compared to left of the center position.

14. A method for detecting an out-of-alignment condition of the wheeled vehicle with at least one steered wheel controlled by a steering wheel, the method comprising;

periodically sampling the position of the steering wheel and determining whether the steering wheel is in a center position, or a left position, of a right position) determining a left fault condition when the number of samples in the left position exceeds the number of samples in the right position by a first predetermined number during the sampling period, determining a right fault condition when the number of samples in the right position exceed the number of samples in the left position by the first predetermined number during the sampling period, resetting to initiate a new sampling period when a left fault condition is determined, or a right fault condition is determined, or the number of samples made by the sampler during the sampling period reaches a second predetermined duration number, indicating to a user a left failure or a right failure based upon a comparison of accumulated right fault conditions and accumulated left conditions over one or more sampling periods.

15. A method as in claim 14 wherein the left fault condition is determined by incrementing a status register when a sample is in the left position and the status register reaches a number that is equal to a initial value in the register plus the first predetermined value, and a right fault condition is determined by decrementing the status register when a sample is in the right position and the status register reaches a number that is equal to the initial value in the status register minus the first predetermined value.

16. A method as in claim 14 wherein the left fault condition is determined by decrementing a status register when a sample is in the left position and the status register reaches a number that is equal to a initial value in the register minus the first predetermined value, and a right fault condition is determined by incrementing the status register when a sample is in the right position and the status register reaches a number that is equal to the initial value in the status register plus the first predetermined value.

17. A method as in claim 14 wherein a left failure is indicated when the accumulated number of left fault conditions exceed the accumulated number of right fault conditions by a third predetermined number, and a right failure when the accumulated number of right fault conditions exceed the accumulated number of left fault conditions by the third predetermined number.

18. A method as in claim 14 wherein the periodic sampling of the position of the steering wheel is at a constant preset time interval.

19. A method as in claim 14 wherein the periodic sampling of the position of the steering wheel is at an interval based upon distance of vehicle travel.

20. A method as in claim 14 wherein the periodic sampling of the position of the steering wheel may changed to a test mode wherein the sampling period is shorter.

* * * * *

UNITED STATES PATENT AND TRADEMARK OFFICE
CERTIFICATE OF CORRECTION

PATENT NO. : 5,795,997
DATED : August 18, 1998
INVENTOR(S) : Arthur J. Gittins, Richard H. Adamson, Lawrence J. Wanner It is certified that error appears in the above-identified patent and that said Letters Patent is hereby corrected as shown below:

Column 6, lines 42 and 47, 2] should read -- 2| --.

Column 6, line 48, "led-OFF" should read -- led=OFF --.

Column 11, line 25, "SectionS" should read --Section 5--.

Column 13, line 9, "up the with" should read --up with--.

Column 16, line 19, "position" (second instance) should read --sensor--.

Column 16, line 43, "of a right position)" should read

--or a right position,--.

Signed and Sealed this

Twenty-fourth Day of August, 1999

Attest:

Q. TODD DICKINSON

*Attesting Officer*     Acting Commissioner of Patents and Trademarks